United States Patent
Fukinuki (10) Patent No.: US 7,864,639 B2
(45) Date of Patent: Jan. 4, 2011

(54) OPTICAL DISK APPARATUS

(75) Inventor: Shigeru Fukinuki, Yokohama (JP)

(73) Assignee: Toshiba Samsung Storage Technology Corporation, Kawasaki (JP)

( * ) Notice: Subject to any disclaimer, the term of this patent is extended or adjusted under 35 U.S.C. 154(b) by 563 days.

(21) Appl. No.: 11/857,710

(22) Filed: Sep. 19, 2007

(65) Prior Publication Data

US 2008/0080333 A1    Apr. 3, 2008

(30) Foreign Application Priority Data

Sep. 28, 2006    (JP) .............................. 2006-265993

(51) Int. Cl.
  *G11B 7/00*    (2006.01)
  *G11B 20/10*   (2006.01)
  *G11B 20/20*   (2006.01)
  *G11B 27/10*   (2006.01)

(52) U.S. Cl. .............. 369/44.29; 369/44.13; 369/44.36; 369/47.25; 369/47.28; 369/53.34

(58) Field of Classification Search .............. 369/44.13, 369/47.28, 53.34
See application file for complete search history.

(56) References Cited

U.S. PATENT DOCUMENTS 6,891,782 B1 *  5/2005  Saito et al. ................ 369/44.29

FOREIGN PATENT DOCUMENTS

| JP | 2001-134943 | 5/2001 |
|----|-------------|--------|
| JP | 2002-279640 | 9/2002 |
| JP | 2003-173540 | 6/2003 |
| JP | 2003-217127 | 7/2003 |
| JP | 3458502     | 8/2003 |
| JP | 2004-227644 | 8/2004 |
| WO | WO 2004/100138 A1 | 11/2004 |

* cited by examiner

*Primary Examiner*—Daniell L Negrón
*Assistant Examiner*—Nicholas Lee
(74) *Attorney, Agent, or Firm*—Oblon, Spivak, McClelland, Maier & Neustadt, L.L.P.

(57) ABSTRACT

An optical disk apparatus includes a signal detection unit which detects a signal corresponding to a wobbling guide groove formed on an optical disk, a timing signal generating unit which generates first and second timing signals in accordance with an amplitude level of the signal detected, a photodetector which detects reflective light from the optical disk, and a wobble signal generating unit which outputs as a wobble signal a signal which is amplified with a low gain amount by the first timing signal in a case where an arithmetic signal, which is generated for the wobble signal on the basis of a signal detected by the photodetector, is at a high amplification level, and outputs as the wobble signal a signal which is amplified with a high gain amount by the second timing signal in a case where the arithmetic signal is at a low amplification level.

7 Claims, 7 Drawing Sheets

F I G. 1

F I G. 2

F I G. 3

F I G. 4

Image of laser power during recording

FIG. 5

Image of reflective light amount during recording (in case of, for example, CD-R/DVD-R)

FIG. 6

Inner-peripheral-side PP signal

FIG. 7

Outer-peripheral-side PP signal

OPTICAL DISK APPARATUS

CROSS-REFERENCE TO RELATED APPLICATIONS

This application is based upon and claims the benefit of priority from prior Japanese Patent Application No. 2006-265993, filed Sep. 28, 2006, the entire contents of which are incorporated herein by reference.

BACKGROUND OF THE INVENTION

1. Field of the Invention

The present invention relates to an optical disk apparatus which detects a signal corresponding to a guide groove that is formed in a wobbling shape in a radial direction of an optical disk.

2. Description of the Related Art

In general, guide grooves indicative of track positions are preformed on recording-type optical disks such as a CD (Compact Disk), a DVD (Digital Versatile Disk), an HD-DVD (High Definition DVD) and a Blu-ray disk. The guide groove wobbles in a radial direction at predetermined cycles. The optical disk apparatus detects a signal (wobble signal) corresponding to the wobbling guide groove, and generates a timing clock at a time of data write on the basis of the detected signal.

Japanese Patent No. 3458502 discloses an optical disk apparatus which is capable of exactly detecting a wobble signal even in a case where a spot of light, which is reflected from an optical disk and is converged, deviates from the center of a photodetector due to an error in attachment position of the photodetector.

This optical disk apparatus includes a photodetector which has two light receiving units that are divided in a radial direction of the optical disk, and which detects the amount of light incident on each of the two light receiving units; an optical pickup head which converges a light beam on an information recording surface on the optical disk and converges reflective light from the optical disk onto the light receiving units of the photodetector; two auto-gain control (AGC) circuits which independently make constant the amplitudes of detection outputs which are obtained by receiving reflective light from a data-recorded area on the optical disk by the light receiving units of the photodetector; two fixed-gain adjustment circuits which independently adjust, with fixed gains, detection outputs, which are obtained by receiving reflective light from a data-non-recorded area on the optical disk by the light receiving units of the photodetector; and a selector which selects one of a subtraction output, which is obtained by performing subtraction between two outputs from the two AGC circuits, and a subtraction output, which is obtained by performing subtraction between two outputs from the two fixed-gain adjustment circuits. In this optical disk apparatus, an output from the selector is produced as a wobble signal.

In the meantime, in an optical disk apparatus, when data is to be recorded on a recording-type optical disk, a laser beam is radiated on the optical disk while the power of the laser beam is quickly varied in order to form pits on the optical disk. In accordance with the variation in power of the laser beam radiated on the optical disk, the amount of reflective light from the optical disk varies. As a result, the signal that is detected in accordance with the amount of reflective light also varies. Since the wobble signal also varies in accordance with the variation in amount of reflective light, the S/N ratio deteriorates.

In a conventional optical disk apparatus, in a case where a wobble signal is extracted from a signal that varies in accordance with the amount of reflective light, the variation in signal is reduced, for example, by using a band-pass filter. However, in the recording-type optical disk such as a DVD+R/RW disk, the frequency of the wobble signal that is used to control the recording position is increased in order to enhance the precision in position at the time of data recording. If the variation in the wobble signal having a high frequency is to be reduced by using a band-pass filter, it is possible that a signal that is read out in accordance with recorded data may be affected. Under the circumstances, there has been a demand for a technique which can improve the S/N ratio of a wobble signal, which varies in accordance with the variation in amount of reflective light from the optical disk, without using the band-pass filter, and thus can detect a stable wobble signal.

BRIEF SUMMARY OF THE INVENTION

According to an aspect of the present invention, there is provided an optical disk apparatus comprising: four photodetectors which detect reflective light from an optical disk; a signal generating unit which obtains an all-addition signal, which is an RF signal, corresponding to a wobbling guide groove which is formed on the optical disk from detected signals of the four photodetectors; a determination unit which determines a type of the optical disk; a slice level switch unit which performs switching to a slice level suitable for the optical disk that is mounted according to the type of the optical disk determined by the determination unit; a timing signal generating unit which generates first and second timing signals in accordance with an amplitude level of the all-addition signal from the signal generating unit and the slice level switched by the type of the optical disk from the slice level switch unit; a wobble signal generating unit which outputs a signal which is amplified with a low gain amount by the first timing signal in a case where first and second arithmetic signals, which are generated for a wobble signal on the basis of signals output from the four photodetectors, are at a high amplitude level, and outputs a signal which is amplified with a high gain amount by the second timing signal in a case where the first and second arithmetic signals are at a low amplitude level an output unit which outputs a wobble signal by subtracting the second arithmetic signal from the first arithmetic signal output from the wobble signal generating unit; and a gain control unit which obtains a ratio between a high amplitude value and a low amplitude value of the wobble signal output from the output unit, and controls switching of the gain amount of the wobble signal generating unit based on the ratio.

According to another aspect of the present invention, there is provided an optical disk apparatus comprising: four photodetectors which detect reflective light from an optical disk; a signal generating unit which obtains an all-addition signal, which is an RF signal, corresponding to a wobbling guide groove which is formed on the optical disk from detected signals of the four photodetectors; a determination unit which determines a type of the optical disk; a slice level switch unit which performs switching to a slice level suitable for the optical disk that is mounted according to the type of the optical disk determined by the determination unit, a timing signal generating unit which generates first and second timing signals in accordance with an amplitude level of the all-addition signal from the signal generating unit and the slice level switched by the type of the optical disk from the slice level switch unit; a wobble signal generating unit which outputs, as a signal on which an LPP signal is superimposed, a signal which is amplified with a low gain amount by the first timing signal in a case where first and second arithmetic signals, which are generated for a wobble signal, on which the LPP signal is superimposed, on the basis of a signal output from the four photodetectors, are at a high amplitude level, and outputs, as the signal on which the LPP signal is superimposed, a signal which is amplified with a high gain amount by the second timing signal in a case where the first and second arithmetic signals are at a low amplitude level; an output unit which outputs a wobble signal by subtracting the second arithmetic signal from the first arithmetic signal output from the wobble signal generating unit; and a gain control unit which obtains a ratio between a high amplitude value and a low amplitude value of the wobble signal output from the output unit, and controls switching of the gain amount of the wobble signal generating unit on the basis of the ratio.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to the accompanying drawings.

Figure 1:
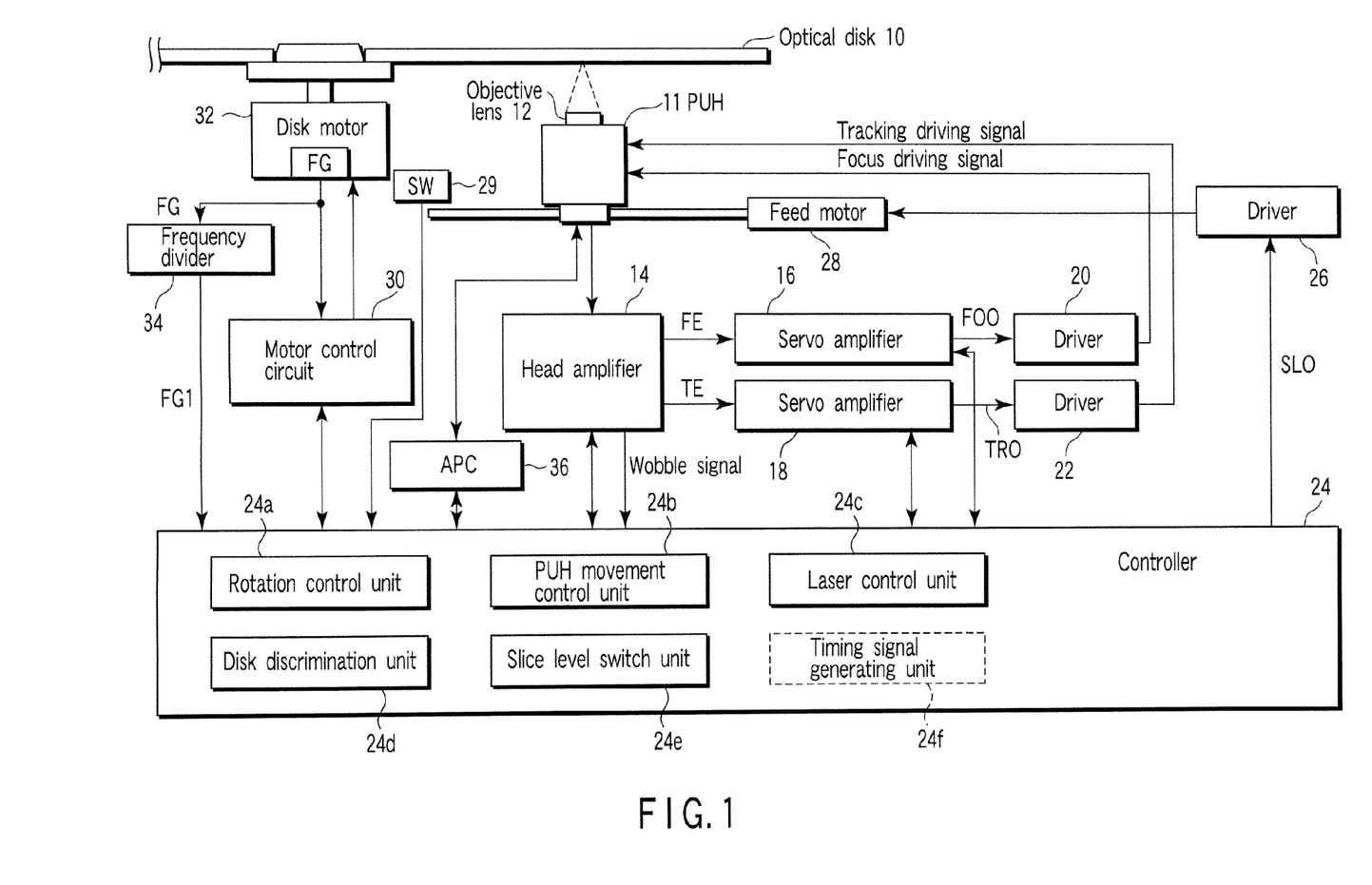
FIG. 1 is a block diagram showing the structure of an optical disk apparatus according to an embodiment of the present invention.

FIG. 1 is a block diagram showing the structure of an optical disk apparatus according to the embodiment.

Spiral tracks are formed on an optical disk 10 that is a recording medium. The optical disk 10 is rotated by a disk motor 32. In the optical disk apparatus according to the embodiment, it is assumed that optical disks, such as a CD (Compact Disk), a DVD (Digital Versatile Disk) and an HD-DVD (High Definition DVD), are usable as the optical disk 10. CD-series disks include, for instance, a CD-ROM, a CD-R and a CD-RW. DVD-series disks include, for instance, a DVD-ROM, a DVD-RAM, a DVD-R, a DVD-RW, a DVD+R and a DVD+RW.

Guide grooves indicative of track positions are preformed on the recording-type optical disk 10. The guide groove wobbles in a radial direction at predetermined cycles. The optical disk apparatus detects a signal (wobble signal) corresponding to the wobbling guide groove, and generates a timing clock at a time of data write on the basis of the detected wobble signal.

Recording/reproduction of data on/from the optical disk 10 is effected by a laser beam which is emitted from an optical pickup head (PUH) 11. The optical pickup head 11 is supported such that the optical pickup head 11 is movable in a radial direction of the optical disk 10 by a feed motor 28 while the optical pickup head 11 is facing a data read surface of the optical disk 10.

The optical pickup head 11 includes a laser diode, a collimator lens, a beam splitter, an objective lens 12, a cylindrical lens, a photodetector, a lens position sensor and a monitor diode.

In addition, the optical pickup head 11 is provided with a biaxial actuator which moves the objective lens 12 in two mutually perpendicular directions. Specifically, the optical pickup head 11 is provided with a focusing actuator which adjusts focusing by moving the objective lens 12 in a focusing direction (i.e. an optical axis direction of the lens), and a tracking actuator which adjusts tracking by moving the objective lens 12 in a tracking direction (i.e. radial direction). The focusing actuator is controlled by a focus driving signal which is output from a driver 20. The tracking actuator is controlled by a tracking driving signal from a driver 22.

The laser diode is driven by an auto power control (APC) circuit 36 which is controlled by a laser control unit 24$c$ of a controller 24, and the laser diode emits a laser beam. The laser beam output from the laser diode is radiated on the optical disk 10 via the collimator lens, the beam splitter and the objective lens 12.

In the optical disk apparatus according to the embodiment, a plurality of laser diodes, which emit laser beams of different wavelengths, are provided. Specifically, an infra-red laser for CD (wavelength: 780 nm), a red laser for DVD (wavelength: 650 nm) and a blue laser for HD-DVD (wavelength: 405 nm) are provided. The APC 36, under the control of the controller 24, enables one of these laser diodes to emit a laser beam corresponding to the discriminated disk.

The objective lens 12 has numerical apertures (NA) corresponding to the respective lasers. The spot size of the laser beam that emerges from the objective lens 12 and falls on an information recording layer of the optical disk 10 is, for example, about 1.35 μm in the case of the laser beam for CD, about 0.94 μm in the case of the laser beam for DVD, and about 0.55 μm in the case of the laser beam for HD-DVD. In the case where a tracking error signal, which is generated by a DPP (Differential Push-Pull) method, is used at the time of, e.g. data recording, the laser beam is radiated such that the laser beam is divided into three beams by, e.g. a diffraction grating which is provided on the optical path, and the beam spots of the three beams are formed on the optical disk 10.

Reflective light from the optical disk 10 is guided to the photodetector via the objective lens 12, the beam splitter and the cylindrical lens. The photodetector comprises, e.g. four divided photodetectors. Signals that are detected by the four photodetectors are amplified to predetermined values by current-voltage conversion (I-V conversion) and are output to a head amplifier 14.

The APC circuit 36 drives the laser diode under the control of the laser control unit 24c of the controller 24. The APC circuit 36 controls the ON/OFF of the laser output and the intensity of the laser beam at the time or reproduction or recording. The APC circuit 36 controls a driving current to the laser diode so that the output of a monitor diode (not shown), which is mounted in the optical pickup head 11, may have a predetermined value.

The laser beam that is output from the laser diode is radiated on the optical disk 10 via the collimator lens, beam splitter and objective lens 12. The laser beam that is reflected by the optical disk 10 is guided to the photodetector (photodetectors 11a, 11b, 11c and 11d in FIG. 2) via the objective lens 12, the beam splitter and the cylindrical lens.

The head amplifier 14 processes a signal from the photodetector and outputs the processed signals. For example, the head amplifier 14 generates and outputs a tracking error signal (TE) which indicates an error between a beam spot center of the laser beam and a track center, a focus error signal (FE) which indicates an error from a just-focus position, and an all-addition signal (RF signal) in which the signals from the photodetectors are added (to be described later in greater detail).

The controller 24 executes a disk discrimination process for discriminating the kind of optical disk 10 that is loaded, on the basis of the signals generated from the head amplifier 14.

The focus error signal FE from the head amplifier 14 is output to a servo amplifier 16, and the tracking error signal TE (DPD signal, PP signal) is output to a servo amplifier 18.

The servo amplifier 16 controls the driver 20 in accordance with the focus error signal FE that is output from the head amplifier 14. A focus driving signal, which is output from the driver 20, causes the focusing actuator to drive the optical pickup head 11 so as to set the laser beam emitted from the optical pickup head 11 just in focus. The laser beam from the optical pickup head 11 is radiated on the recording film of the optical disk 10.

The servo amplifier 18 controls the driver 22 in accordance with the tracking error signal TE which is output from the head amplifier 14. A tracking driving signal, which is output from the driver 22, causes the tracking actuator to drive the optical pickup head 11, thereby executing a tracking servo so as to make the laser beam emitted from the optical pickup head 11 constantly trace the track on the optical disk 10.

The disk motor 32 is a spindle motor, for instance. The disk motor 32 is provided with a frequency generator (FG) which generates a signal in accordance with a rotational angle. The frequency generator (FG) generates FG signals corresponding to a rotational angle, for example, 18 FG signals for a single rotation, making use of, e.g. an electromotive force of a magnetic field coil of a stator or an output of a Hall element which detects the rotational angle of the magnet of a rotor.

A frequency divider 34 divides the FG signal that is output from the disk motor 32, and generates an FG1 signal which indicates, for example, one rotation of the disk motor 32. The frequency divider 34 outputs the FG1 signal to the controller 24. The controller 24 compares the FG1 signal with an internal reference frequency, controls a motor control circuit 30 in accordance with an error of the comparison result, and rotates the disk motor 32 at a predetermined number of revolutions.

The controller 24 is configured to include processors and memories (RAM, ROM). The controller 24 causes the processors to execute various programs stored in the memories, thereby executing an overall control of the apparatus. The controller 24 includes a rotation control unit 24a, a PUH movement control unit 24b, a laser control unit 24c, a disk discrimination unit 24d, a slice level switch unit 24e and a timing signal generating unit 24f. These circuits are realized by hardware and/or software.

The rotation control unit 24a controls the rotation of the disk motor 32 via the motor control circuit 30.

The PUH movement control unit 24b drives the feed motor 28 via a driver 26, thereby executing a control to move the optical pickup head 11 in the radial direction of the optical disk 10. The feed motor 28 is a stepping motor, for instance. If the optical pickup head 11 is moved by the feed motor 28 in the radially inward direction of the optical disk 10, a switch (SW) 29 detects that the optical pickup head 11 is in the innermost position. The PUH movement control unit 24b executes a control to move the optical pickup head 11 from the initial position, which is detected by the switch (SW) 29, to a predetermined access position.

For example, it is assumed that the switch (SW) 29 is set to detect a position corresponding to a radius of 25 mm of the optical disk 10. Also assume that a feed screw that is attached to the feed motor 28 has such a speed-change ratio that the optical pickup head 11 is moved by 3 mm each time the feed motor 28 (stepping motor) is rotated by a single revolution. In this case, the PUH movement control unit 24b of the controller 24 outputs, after the switch (SW) 29 detects the optical disk 10, a driving signal SLO for rotating the feed motor 28 by a single revolution to the driver 26, thus being able to move the optical pickup head 11 by 3 mm. For example, after the optical pickup head 11 is detected by the switch (SW) 29, the feed motor 28 is rotated by one revolution so as to move the optical pickup head 11 in a radially outward direction of the optical disk 10. Thereby, the optical pickup head 11 is moved to a position corresponding to 28 mm in the radial direction of the optical disk 10. The laser control unit 24c controls the APC circuit 36 and causes the laser diode of the optical pickup head 11 to emit a laser beam. The optical pickup head 11 is equipped with laser diodes for emitting an infrared laser beam for CD (hereinafter referred to as "CD laser beam"), a red laser beam for DVD ("DVD laser beam") and a blue laser beam for HD-DVD ("HD laser beam").

The disk discrimination unit 24d discriminates the kind of the optical disk 10, which is loaded in the optical disk apparatus, on the basis of a signal that is output from the head amplifier 14. It is assumed that the disk discrimination unit 24d can discriminate not only the kind of disk (e.g. CD, DVD, HD-DVD, etc.) but also the product type of the optical disk 10 of the same kind. The disk discrimination unit 24d reads data for discriminating the disk, which is recorded on a predetermined region of the optical disk 10, thereby discriminating the kind of the optical disk 10. In the optical disk apparatus according to the present embodiment, any kind of disk discrimination method is usable.

The slice level switch unit 24e controls switching of the slice level, which is used for generating a timing signal. The slice level switch unit 24e outputs to a wobble detection circuit 14u of the head amplifier 14 a slice level switch signal which instructs switching to an optimal slice level for the optical disk 10 that is loaded in the optical disk apparatus, in accordance with the kind (or product type) of the optical disk 10 that is discriminated by the disk discrimination unit 24d.

Figure 2:
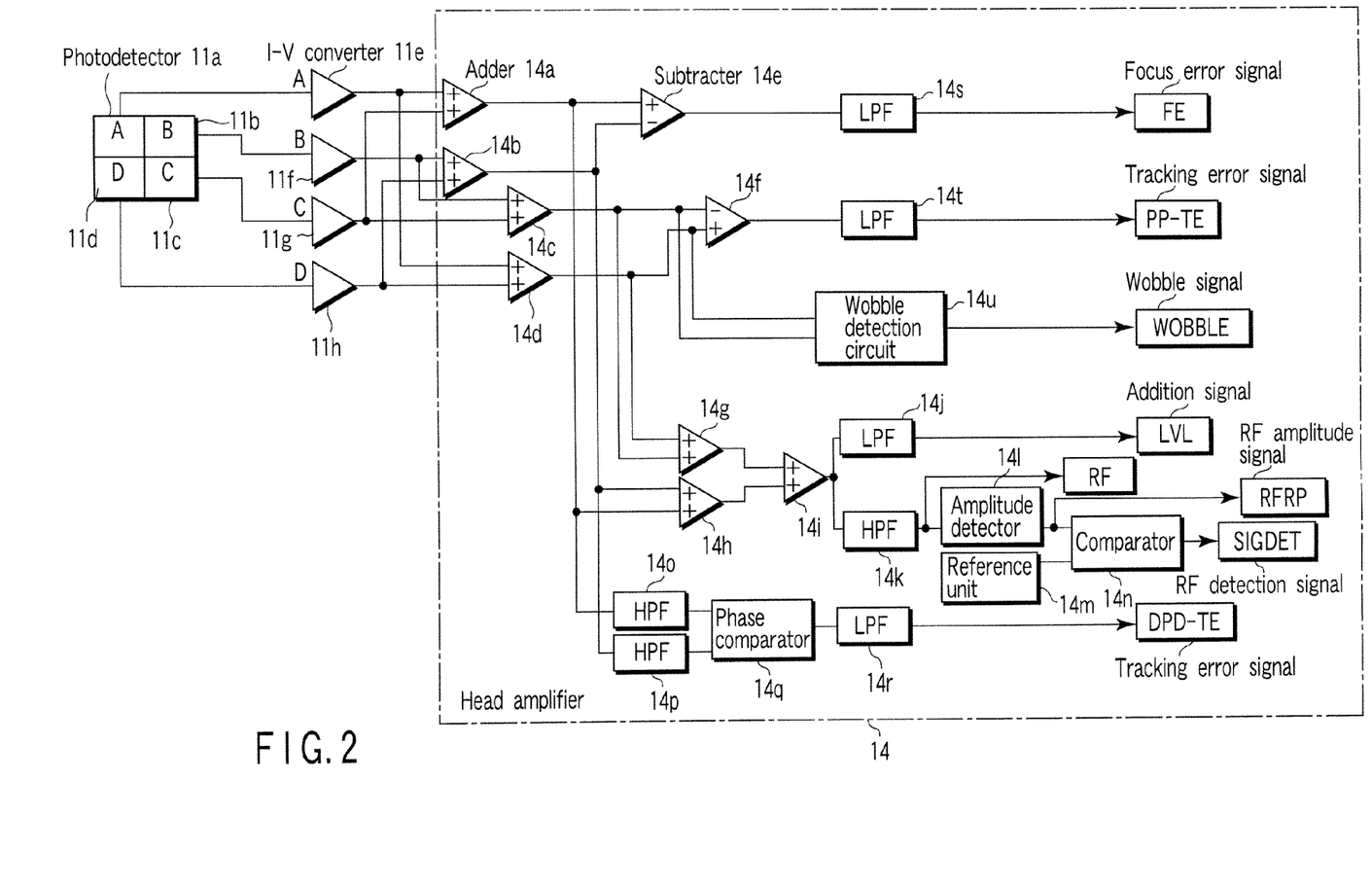
FIG. 2 shows the detailed structures of photodetectors of an optical pickup head 11 and a head amplifier 14 in the embodiment.

FIG. 2 shows detailed structures of the photodetectors (11a, 11b, 11c, 11d) of the optical pickup head 11 and the head amplifier 14.

Signals A, B, C and D, which are detected by the four divisional photodetectors 11a, 11b, 11c and 11d, are current-to-voltage converted to a predetermined voltage value by I-V converters 11e, 11f, 11g and 11h which are provided in the optical pickup head 11.

The signal A that is output from the I-V converter 11e is input to adders 14a and 14d in the head amplifier 14. The signal B that is output from the I-V converter 11f is input to adders 14b and 14c in the head amplifier 14. The signal C that is output from the I-V converter 11g is input to adders 14a and 14c in the head amplifier 14. The signal D that is output from the I-V converter 11h is input to adders 14b and 14d in the head amplifier 14. Accordingly, the adder 14a outputs a signal (A+C) in which the signal A and signal C are added. Similarly, the adder 14b outputs a signal (B+D), the adder 14c outputs a signal (B+C), and the adder 14d outputs a signal (A+D).

The signal (A+C), which is output from the adder 14a, is input to a subtracter 14e, an adder 14h and a high-pass filter (HPF) 14o. The signal (B+D), which is output from the adder 14b, is input to the subtracter 14e, an adder 14h and a high-pass filter (HPF) 14p. The signal (B+C), which is output from the adder 14c, is input to a subtracter 14f and an adder 14g. The signal (A+D), which is output from the adder 14d, is input to the subtracter 14f and the adder 14g.

The subtracter 14e subtracts the signal (B+D), which is output from the adder 14b, from the signal (A+C) which is output from the adder 14a, and outputs a resultant subtraction signal. The signal from the subtracter 14e is passed through a low-pass filter (LPF) 14s and is output as a focus error signal (FE). That is, the focus error signal FE=(A+C)−(B+D) is produced.

The subtracter 14f subtracts the signal (B+C), which is output from the adder 14c, from the signal (A+D) which is output from the adder 14d, and outputs a resultant subtraction signal. The signal from the subtracter 14f is passed through a low-pass filter (LPF) 14t and is output as a tracking error signal (PP-TE) according to a push-pull method. That is, the tracking error signal (PP-TE)=(A+D)−(B+C) according to a push-pull method is produced.

A phase comparator 14q receives the signal (A+C), which is output from the adder 14a via the HPF 14o, and the signal (B+D) which is output from the adder 14b via the HPF 14p, and outputs a signal representative of a phase difference between the two signals (A+C) and (B+D), that is, a signal that is obtained by subtracting the signal (B+D) from the signal (A+C). The signal that is output from the phase comparator 14q is passed through a low-pass filter (LPF) 14r and is output as a tracking error signal TE (Differential Phase Detection (DPD)-TE) according to a differential phase detection method. That is, the tracking error signal (DPD-TE) =φ(A+C)−φ(B+D) according to a differential phase detection method is produced.

The adder 14g adds the signal (A+D) from the adder 14d and the signal (B+C) from the adder 14c and outputs an addition signal. The adder 14h adds the signal (A+C) from the adder 14a and the signal (B+D) from the adder 14b and outputs an addition signal. An adder 14l adds the signals from the adder 14g and adder 14h and outputs an addition signal. In short, the adder 14l outputs a signal (A+B+C+D) in which the signals from all photodetectors 11a, 11b, 11c and 11d are added. The signal from the adder 14l is passed through a low-pass filter (LPF) 14j and is output as an addition signal LVL (hereinafter referred to as "LVL signal").

In addition, the signal that is output from the adder 14l is passed through a high-pass filter (HPF) 14k and is output as an information signal RF (hereinafter referred to as "RF signal"). The signal that is output through the HPF 14k is also input to an amplitude detector 14l. The amplitude detector 14l detects an amplitude value of the RF signal and outputs an RF amplitude signal RFRP that varies in proportion to this amplitude value.

The RF amplitude signal that is output from the amplitude detector 14l is input to a comparator 14n. The comparator 14n compares the level of the RF amplitude signal with a reference value which is preset in a reference unit 14m. If the level of the RF amplitude signal is higher than the reference value, the comparator 14n outputs an RF detection signal SIGDET (hereinafter referred to as "SIGDET signal"). The SIGDET signal indicates that the RF signal, which represents information recorded on the optical disk 10, has been detected.

The wobble detection circuit 14u is a circuit which generates a wobble signal (WOBBLE) by detecting a difference between the signals output from the adder 14c and adder 14d. The wobble detection circuit 14u in this embodiment is able to generate a stable wobble signal by dynamically switching gains in accordance with amplitude variations of the signals that are output from the adder 14c and adder 14d.

Figure 3:
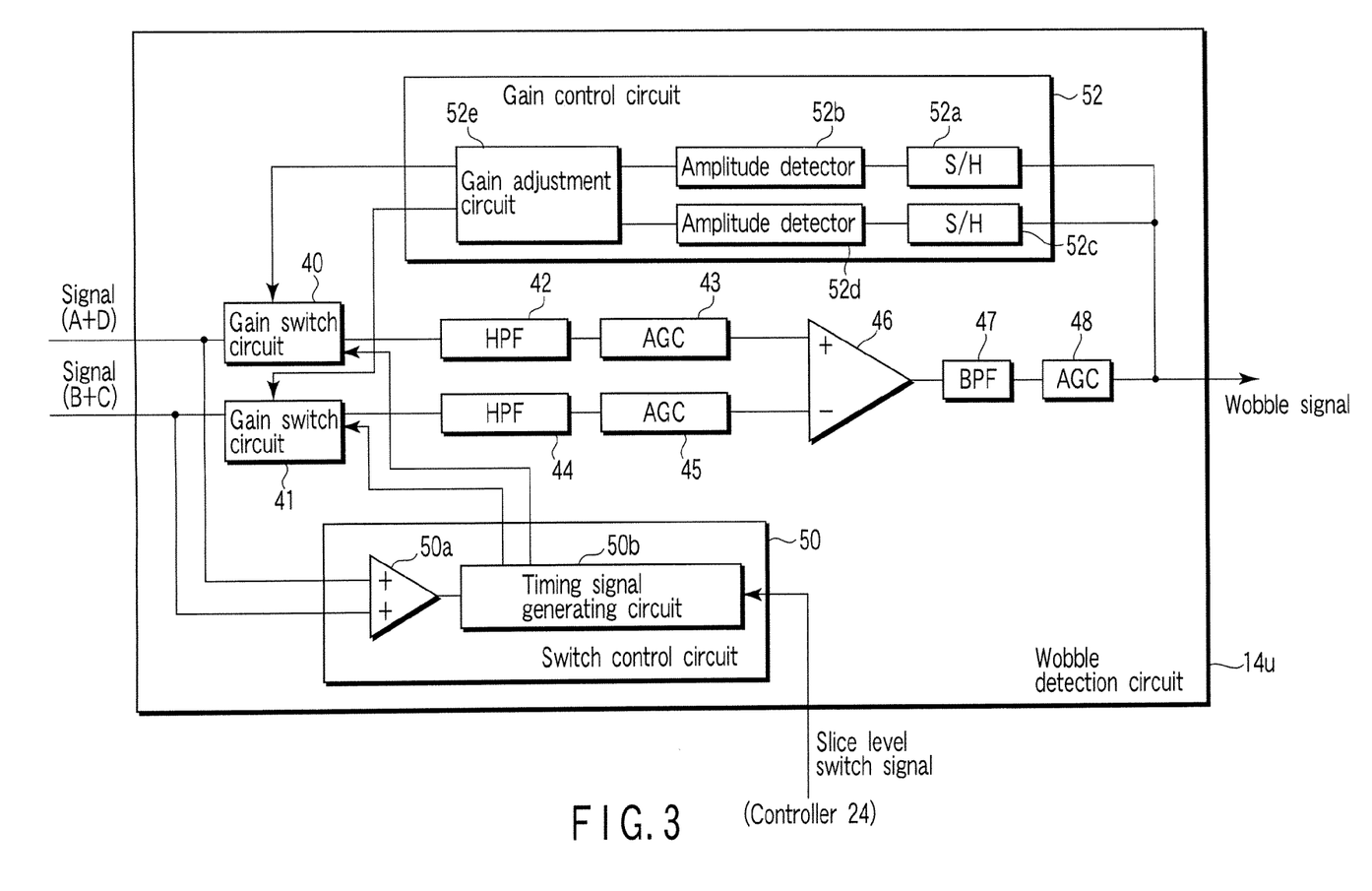
FIG. 3 is a block diagram showing the detailed structure of a wobble detection circuit 14$u$ in the embodiment.

FIG. 3 is a block diagram showing a detailed structure of the wobble detection circuit 14u in the present embodiment.

As is shown in FIG. 3, the wobble detection circuit 14u includes a gain switch circuit 40 which receives a signal output from the adder 14d, and a gain switch circuit 41 which receives a signal output from the adder 14c. The signal that is output from the adder 14d is the signal (A+D) in which the signals detected by the photodetectors 11a and 11d are added. This signal is an inner-peripheral-side push-pull (PP) signal which is detected on the inner peripheral side of the groove. The signal that is output from the adder 14c is the signal (B+C) in which the signals detected by the photodetectors 11b and 11c are added. This signal is an outer-peripheral-side push-pull (PP) signal which is detected on the outer peripheral side of the groove.

The gain switch circuit 40, 41 is a circuit for adjusting the gain of the signal that is input from the adder 14c, 14d. In accordance with a timing signal that is output from a switch control circuit 50, the gain switch circuit 40, 41 can dynamically switch the gain for the signal that is input from the adder 14c, 14d. The gain switch circuit 40, 41 amplifies the signal input from the adder 14c, 14d with a low gain when this signal is in a high amplitude level state, and amplifies the signal input from the adder 14c, 14d with a high gain when this signal is in a low amplitude level state.

A subtracter 46 produces a signal which represents a difference between a signal (inner-peripheral-side PP signal) which is input via the gain switch circuit 40, a high-pass filter (HPF) 42 and an AGC circuit 43, and a signal (outer-peripheral-side PP signal) which is input via the gain switch circuit 41, a high-pass filter (HPF) 44 and an AGC circuit 45. A signal, which is output from the subtracter 46 via a band-pass filter (BPF) 47 and an AGC circuit 48, becomes a wobble signal.

The wobble detection circuit 14u includes a switch control circuit 50 and a gain control circuit 52.

The switch control circuit 50 is a circuit which generates a timing signal for controlling the gain switching in the gain switch circuit 40, 41. The gain control circuit 52 is a circuit which evaluates the properness of the amplifier gain ratio in the gain switch circuit 40, 41 with respect to the signal that has passed through the gain switch circuit 40, 41, and adjusts the gain in the gain switch circuit 40, 41 in accordance with the evaluation result.

The switch control circuit 50 includes an adder 50a and a timing signal generating circuit 50b. The adder 50a adds the signals output from the adder 14c and adder 14d and outputs an addition signal to the timing signal generating circuit 50b. The timing signal generating circuit 50b compares the signal, which is output from the adder 50a, with a preset slice level, and generates a timing signal and outputs it to the gain switch circuit 40, 41. The switch control circuit 50 can switch the slice level in accordance with a slice level switch signal which is output from the slice level switch unit 24e of the controller 24.

The gain control circuit 52 includes sample/hold circuits (S/H) 52a and 52c, amplitude detectors 52b and 52d and a gain adjusting circuit 52e.

The sample/hold circuit 52a, 52c samples and holds the wobble signal that is output via the AGC circuit 48. The sample/hold circuit 52a samples and holds the wobble signal when the amplitude level of the signal from the AGC circuit 48 is high. The sample/hold circuit 52c samples and holds the wobble signal when the amplitude level of the signal from the AGC circuit 48 is low. When the optical disk apparatus writes data on the optical disk 10, the optical disk apparatus forms pits on the optical disk 10 by quickly switching the laser power of the laser beam, which is emitted from the optical pickup head 11, between a high power state and a low power state. By switching the laser power of the laser beam, the amount of reflective light from the optical disk 10 varies. In accordance with the variation in amount of reflective light, the signal that is output from the wobble detection circuit 14u (AGC circuit 48) changes between a high amplitude level state and a low amplitude level state. The sample/hold circuits 52a and 52c sample and hold the signal in the high amplitude level state and the signal in the low amplitude level state, respectively.

Also in the case of reading data from the optical disk 10, the signal that is output from the wobble detection circuit 14u (AGC circuit 48) changes between the high amplitude level state and the low amplitude level state. In this case, too, the sample/hold circuits 52a and 52c sample and hold the signal in the high amplitude level state and the signal in the low amplitude level state, respectively.

The amplitude detector 52b detects the amplitude value of the signal which is sampled/held by the sample/hold circuit 52a. The amplitude detector 52d detects the amplitude value of the signal which is sampled/held by the sample/hold circuit 52c. The gain adjustment circuit 52e detects a ratio between the amplitude value detected by the amplitude detector 52b and the amplitude value detected by the amplitude detector 52d. In addition, on the basis of the ratio between the amplitude values, the gain adjustment circuit 52e adjusts the gains in the gain switch circuits 40 and 41 so as to optimize the gains which can reduce the variation in signal. Specifically, the gain adjustment circuit 52e adjusts the low gain amount for the signal in the high amplitude level state and the high gain amount for the signal in the low amplitude level state in the gain switch circuit 40, 41.

Figure 4:
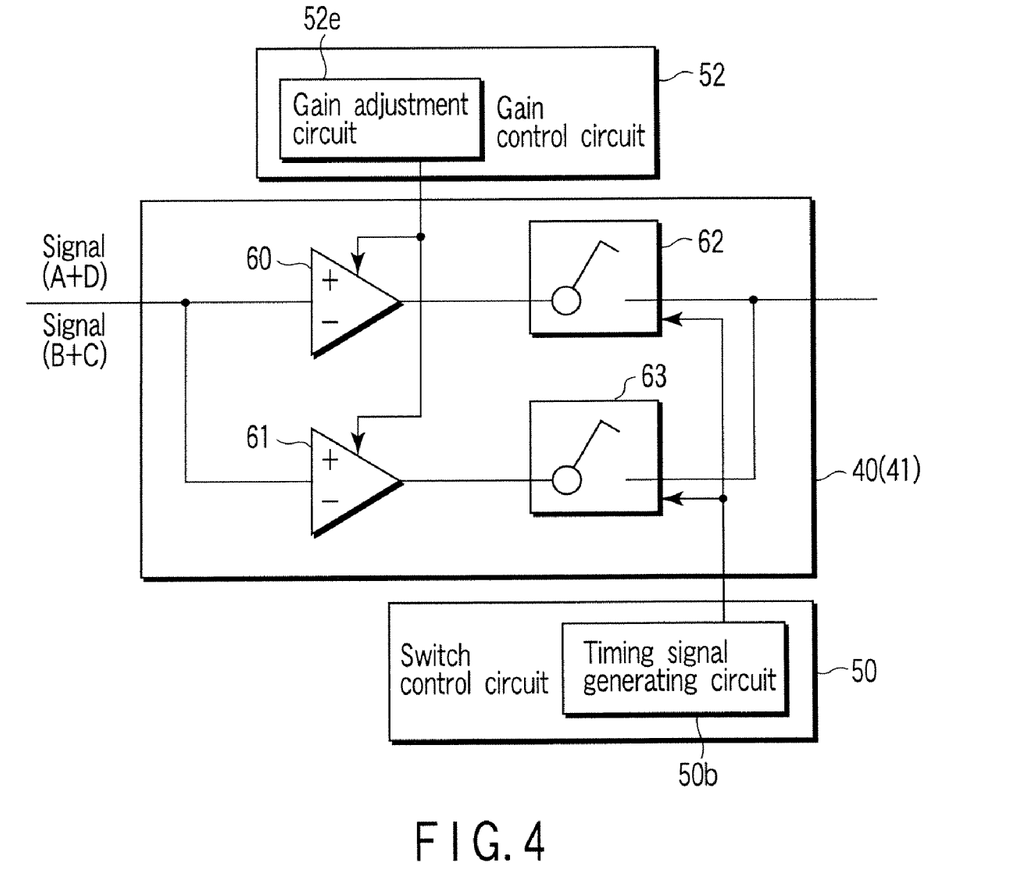
FIG. 4 is a block diagram showing the detailed structure of a gain switch circuit 40, 41 in the embodiment.

FIG. 4 is a block diagram showing a detailed structure of the gain switch circuit 40, 41 in the present embodiment. The gain switch circuit 40 and gain switch circuit 41 have the same structure. In the description below, the gain switch circuit 40 is described by way of example.

As shown in FIG. 4, the gain switch circuit 40 includes a high gain amplifier 60, a low gain amplifier 61 and analog switches 62 and 63. The high gain amplifier 60 receives the signal from the adder 14c and amplifies this signal with a high gain. The low gain amplifier 61 receives the signal from the adder 14c and amplifies this signal with a gain lower than the gain of the high gain amplifier 60.

The analog switch 62 and 63 are operated by the timing signal that is output from the timing signal generating circuit 50b of the switch control circuit 50, and the signal from one of the high gain amplifier 60 and low gain amplifier 61 is output. Specifically, when the analog switch 62 is turned on (connected), the analog switch 63 is turned off (disconnected). When the analog switch 62 is turned off (disconnected), the analog switch 63 is turned on (connected). When the signal input from the adder 14c, 14d is in the high amplitude level state, the low gain amplifier 61 is connected. When the signal input from the adder 14c, 14d is in the low amplitude level state, the high gain amplifier 60 is connected.

Next, the wobble signal detection operation of the optical disk apparatus according to the present embodiment is described.

The wobble signal detection operation during data recording on the optical disk 10 is described. When data is to be recorded on the optical disk 10, the controller 24 causes the rotation control unit 24a to control the motor control circuit 30, thereby rotating the optical disk 10. In addition, the controller 24 causes the PUH movement control unit 24b to control the driver 26, thereby moving the optical pickup head 11 in the radial direction of the optical disk 10 so that the laser beam from the optical pickup head 11 may be radiated on a data recording position on the optical disk 10.

Further, the laser control unit 24c of the controller 24 controls the APC circuit 36, thereby causing the optical pickup head 11 to emit the laser beam corresponding to the data to be recorded on the optical disk 10.

In the case where data is to be recorded on the optical disk 10, the laser control unit 24c quickly switches the laser power of the laser beam that is output from the optical pickup head 11, thereby to form pits, which correspond to the data, on the optical disk 10.

Figure 5:
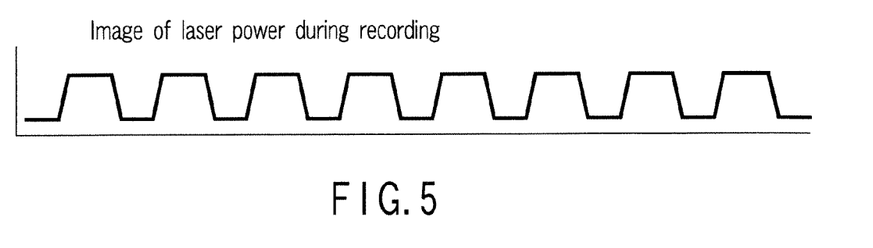
FIG. 5 shows an example of a variation in laser power of laser light (light pulses) during data recording.

FIG. 5 shows an example of a variation in laser power of laser light (light pulses) during data recording. In the example shown in FIG. 5, the laser power of the laser beam emitted from the optical pickup head 11 is simply switched between a high power state and a low power state. The laser beam shown in FIG. 5 is radiated from the optical pickup head 11 onto the optical disk 10. Thereby, pits are formed on positions on the recording layer of the optical disk 10, at which the laser beam with high laser power has been radiated.

Figure 6:
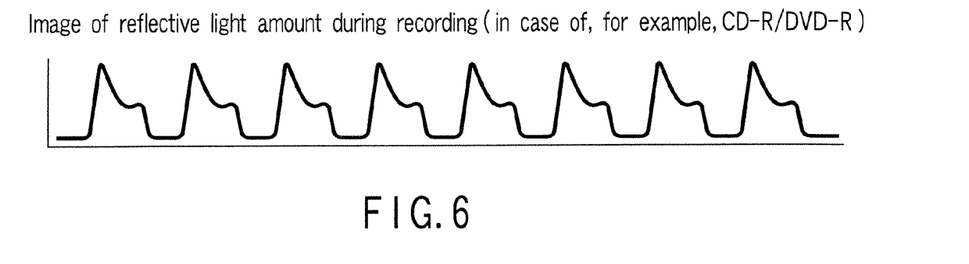
FIG. 6 shows an example of a variation in amount of reflective light from an optical disk 10 during data recording.

FIG. 6 shows an example of a variation in amount of reflective light from the optical disk 10 during data recording. In the example shown in FIG. 6, a CD-R or a DVD-R, for instance, which has so-called "High-to-Low" disk characteristics, is used as the optical disk 10. As shown in FIG. 6, when the laser beam is radiated, the amount of reflective light takes a peak value at the beginning, and then the amount of reflective light gradually decreases due to the formation of the pits. In the meantime, the HD-DVD has so-called "Low-to-High" disk characteristics, which are opposite to the characteristics of the CD-R or DVD-R. In short, in the case of the HD-DVD, the amount of reflective light gradually increases due to the formation of pits.

For the purpose of easier description, in the drawings to be described below, it is assumed that the amount of reflective light is proportional to the laser power of the laser beam.

The reflective light from the optical disk 10 is converted to electric signals by the photodetectors 11a, 11b, 11c and 11d that are provided on the optical pickup head 11, and the electrical signals are output to the head amplifier 14. By the structure shown in FIG. 2, the head amplifier 14 generates various signals on the basis of the signals output from the photodetectors 11a, 11b, 11c and 11d.

The adder 14d shown in FIG. 2 outputs the inner-peripheral-side PP signal (A+D) in which the signals detected by the photodetectors 11a and 11d are added. The adder 14c outputs the outer-peripheral-side PP signal (B+C) in which the signals detected by the photodetectors 11b and 11c are added. The inner-peripheral-side PP signal and outer-peripheral-side PP signal vary in accordance with the wobble of the groove formed on the optical disk 10.

Figure 7:
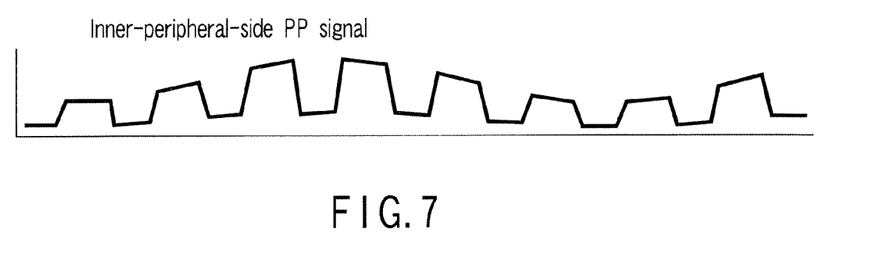
FIG. 7 shows an example of a variation of an inner-peripheral-side PP signal.
Figure 8:
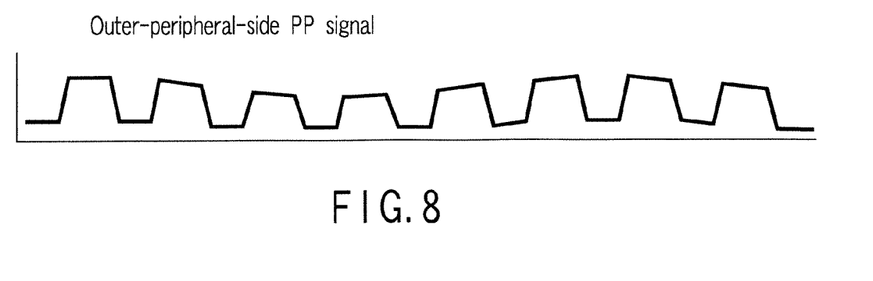
FIG. 8 shows an example of a variation of an outer-peripheral-side PP signal.

FIG. 7 shows an example of the variation of the inner-peripheral-side PP signal, and FIG. 8 shows an example of the variation of the outer-peripheral-side PP signal. As shown in FIG. 7 and FIG. 8, the variation component in the amount of reflective light due to the light pulses, which are shown in FIG. 5, also occurs as a rectangular wave of the same phase in each of the PP signals detected on the inner peripheral side and outer peripheral side of the groove. In addition, the wobble component formed in the groove occurs as sine waves of opposite phases in the inner-peripheral-side PP signal and the outer-peripheral-side PP signal. The wobble signal is generated by detecting a difference between the inner-peripheral-side PP signal and the outer-peripheral-side PP signal.

Figure 9:
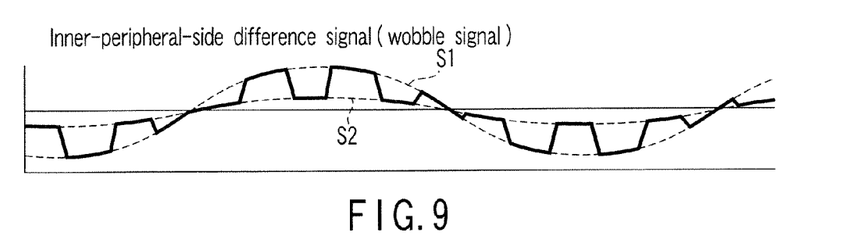
FIG. 9 shows a waveform of a signal which represents a difference between the inner-peripheral-side PP signal and the outer-peripheral-side PP signal.

FIG. 9 shows a waveform of a signal which represents a difference between the inner-peripheral-side PP signal shown in FIG. 7 and the outer-peripheral-side PP signal shown in FIG. 8. As shown in FIG. 9, stepped components occur due to the variation in the amount of reflective light from the optical disk 10, which results from the variation in laser power shown in FIG. 5. A waveform S1 shown in FIG. 9 is a sine wave which represents a wobble component included in the inner-peripheral-side PP signal. A waveform S2 is a sine wave which represents a wobble component included in the outer-peripheral-side PP signal. Specifically, the waveform with stepped components shown in FIG. 9 is a combination of sine waves with different amplitudes. In this signal, since the S/N ratio is poor. Thus, in the optical disk apparatus according to the embodiment, the stepped components are reduced by dynamically switching the gains of the gain switch circuits 40 and 41 in the wobble detection circuit 14u in accordance with the variations of the signals.

The wobble detection circuit 14u shown in FIG. 3 amplifies the inner-peripheral-side PP signal which is output from the adder 14d, while dynamically switching the gain, and amplifies the outer-peripheral-side PP signal which is output from the adder 14c, while dynamically switching the gain. In short, the gain switch circuit 40, 41 of the wobble detection circuit 14u switches the gain in accordance with the timing signal that is output from the switch control circuit 50.

Figure 10:
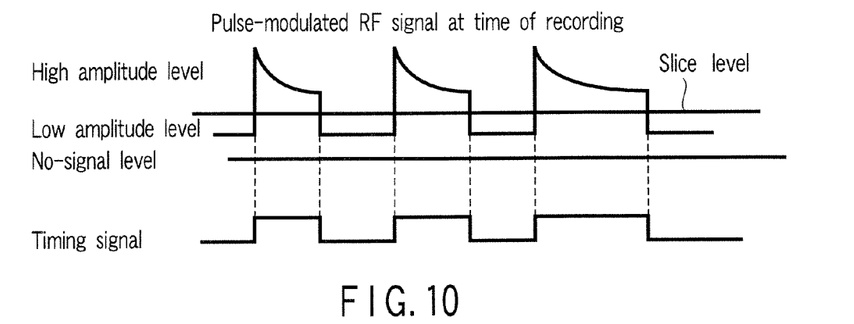
FIG. 10 is a view for explaining the generation of a timing signal in a timing signal generating circuit 50$b$ in the embodiment.

FIG. 10 is a view for explaining the generation of the timing signal in the timing signal generating circuit 50b in the present embodiment.

The adder 50a of the switch control circuit 50 adds the signals that are output from the adder 14c and adder 14d, and outputs the addition signal to the timing signal generating circuit 50b. Specifically, the all-addition signal, in which all signals from the photodetectors 11a, 11b, 11c and 11d are added, is input to the timing signal generating circuit 50b. As shown in FIG. 10, the signal that is input to the timing signal generating circuit 50b varies between the low amplitude level and high amplitude level in accordance with the variation in laser power of the laser beam that is radiated from the optical pickup head 11. The timing signal generating circuit 50b compares the input signal with a preset slice level, and generates a timing signal which represents a timing of switching between the low amplitude level and high amplitude level, as shown in FIG. 10.

The switch control circuit 50 generates the timing signal on the basis of the signals that are used for generating the wobble signal. Thus, even if the frequency of the wobble signal increases, the switch control circuit 50 can generate a timing signal corresponding to the variation of the signal and can switch the gain of the gain switch circuit 40, 41 at a proper timing. The gain switch circuit 40, 41 switches the gain in accordance with the timing signal shown in FIG. 10, thereby reducing the stepped components of the signals that are output from the adder 14c and adder 14d.

Figure 11:
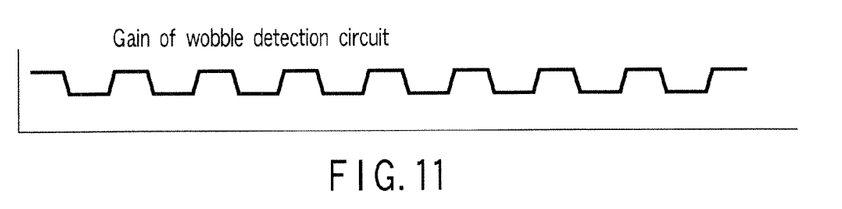
FIG. 11 shows a variation in gain which is switched in the gain switch circuit 40, 41 in the embodiment.

FIG. 11 shows a variation of the gain that is switched in the gain switch circuit 40, 41. As shown in FIG. 11, since the laser power of the laser beam radiated on the optical disk 10 is high (see FIG. 5), the gain is low in the state in which the signals output from the adder 14c and adder 14d are at a high amplitude level, and the gain is high in the state in which the signals output from the adder 14c and adder 14d are at a low amplitude level.

As a result, the inner-peripheral-side PP signal, in which the stepped components are reduced by the gain switch circuit 40, is input to the subtracter 46 via the HPF 42 and AGC circuit 43. Besides, the outer-peripheral-side PP signal, in which the stepped components are reduced by the gain switch circuit 41, is input to the subtracter 46 via the HPF 44 and AGC circuit 45. The subtracter 46 outputs the wobble signal that represents the difference between the inner-peripheral-side PP signal and the outer-peripheral-side PP signal.

Figure 12:
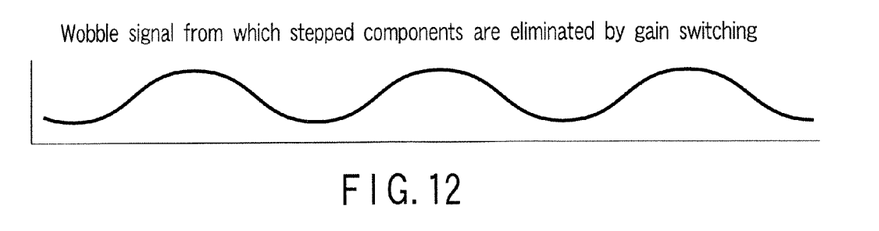
FIG. 12 shows a waveform of a wobble signal.

FIG. 12 shows the wobble signal that is output from the subtracter 46. As shown in FIG. 12, the wobble signal with no stepped components can be generated via the gain switch circuits 40 and 41.

The timing signal generating circuit 50b can vary the slice level in accordance with a slice level switch signal from the slice level switch unit 24e of the controller 24. Thus, in accordance with the kind, etc., of the optical disk 10 that is loaded in the optical disk apparatus, the timing signal generating circuit 50b can properly determine the variations in the states of the high amplitude level and low amplitude level of the signal that is generated in accordance with the reflective light from the optical disk 10. Thereby, the timing signal generating circuit 50b can generate the timing signal for properly switching the gain of the gain switch circuit 40, 41 in accordance with the kind, etc., of the optical disk 10.

Furthermore, another signal, which is superimposed on the wobble signal, can similarly be stably detected. For example, a land pre-pit (LPP) is formed between grooves on the DVD-R/RW optical disk 10. Thus, an LPP signal is detected from the wobble signal on which the LPP signal is superimposed. The LPP signal is a signal which is used at the time of data write.

The LPP signal is a signal which appears in a pulse shape at a peak (at a time point of maximum amplitude) of the wobble signal that is a sine wave. According to the DVD-R/RW standard, data with a pulse length of 14 T is recorded in accordance with the LPP. In an ordinary eight-to-fourteen modulation (EFM) signal, non-return-to-zero inverted (NRZI) modulation is adopted. Thus, when data with a pulse length of 14 T is recorded, there are a case in which a pit with a pulse length of 14 T occurs and a case in which a space occurs.

Figure 13:
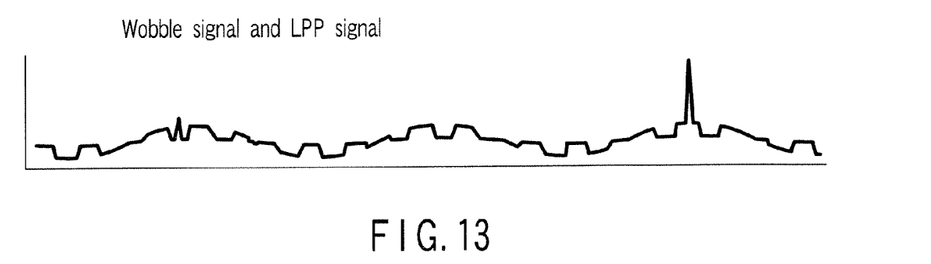
FIG. 13 shows a wobble signal and an LPP signal, which are detected in the case where the gain switch circuit 40, 41 according to the embodiment is not used.

FIG. 13 is a view showing a wobble signal and an LPP signal, which are detected in the case where the gain switch circuits 40 and 41 according to the present embodiment are not used. In FIG. 13, the first wave component of the sine wave, which represents the wobble signal, overlaps the space, and so the amplitude of the LPP signal appears at a low level. On the other hand, the third wave component of the sine wave overlaps the pit, and so the amplitude of the LPP signal appears at a high level.

In this case, if the slice level for detecting the LPP signal is not proper, it is possible that the LPP signal that appears at the first wave component of the sine wave is not detected. In other words, the detection ratio of the LPP signal may decrease, and the data write operation using the LPP signal may be affected.

By contrast, in the optical disk apparatus of the present embodiment, the signal is amplified by dynamically switching the gain in the gain switch circuit 40, 41 of the wobble detection circuit 14*u*. Thereby, the LPP signal that appears at the first wave component of the sine wave shown in FIG. 13 is amplified with a high gain.

Figure 14:
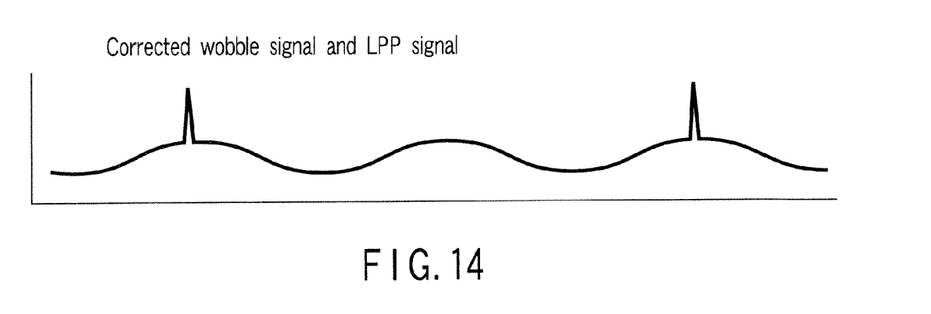
FIG. 14 shows a wobble signal and an LPP signal, which are detected in the case where the gain switch circuit 40, 41 according to the embodiment is used.

FIG. 14 is a view showing a wobble signal and an LPP signal which are detected in the case where the gain switch circuits 40 and 41 of the embodiment are used. As shown in FIG. 14, stepped components of the wobble signal are reduced, and the amplitude of the LPP signal superimposed on the wobble signal is so stabilized as to have a detectable level. In this manner, in the optical disk apparatus of the present embodiment, the wobble signal including the LPP signal can stably be detected. Therefore, the data write operation using the LPP signal can stably be executed.

The above description is directed to the wobble signal detection operation at the time of data write. However, the correction of the wobble signal can similarly be executed at the time of reading (reproducing) data from the data-recorded optical disk 10.

When the data-recorded optical disk 10 is reproduced, a variation in amount of reflective light similarly occurs as in the case of data write, due to the pits formed on the optical disk 10. Thus, like the time of data write, the gain for the wobble signal, which varies in accordance with the variation in amount of reflective light, is dynamically switched and the signal is amplified. Thereby, the stable wobble signal, with the variation suppressed, can be detected. In this case, the slice level is set for the signal that is detected by the head amplifier 14, for example, all-addition signal (RF signal). The slice level and the detected all-addition signal are compared and a timing signal is generated.

Figure 15:
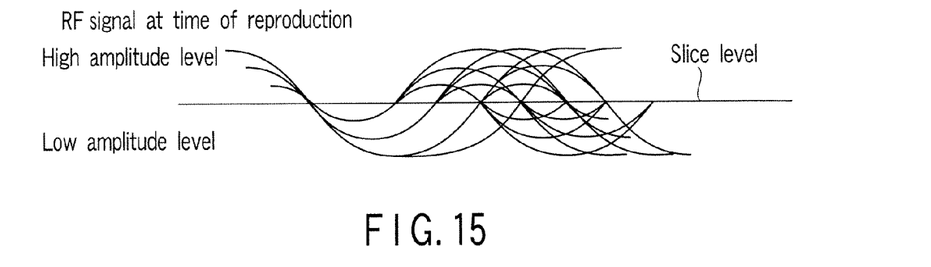
FIG. 15 shows a slice level which is set for an all-addition signal (RF signal) at a time of reproduction.

FIG. 15 shows the slice level that is set for the all-addition signal at the time of reproduction. The timing signal generating circuit 50*b* of the wobble detection circuit 14*u* generates the timing signal by comparing the all-addition signal at the time of reproduction and the slice level. In accordance with the timing signal, the gain in the gain switch circuit 40, 41 is dynamically switched. Thereby, also at the time of reproduction, the stable wobble signal, with the variation suppressed, can be detected.

The wobble detection circuit 14*u* in the present embodiment includes the gain control circuit 52. The gain control circuit 52 is configured to evaluate the properness of the gain ratio between the gain for the high-amplitude-level signal and the gain for the low-amplitude-level signal with respect to the signals which are amplified with the gains thereof being dynamically switched by the gain switch circuits 40 and 41, and also configured to adjust the gains of the gain switch circuits 40 and 41.

The laser power of the laser beam radiated from the optical pickup head 11 differs between the time of data write (record) on the optical disk 10 and the time of data read (reproduction) from the optical disk 10. Accordingly, the difference between the amplitude value in the high-amplitude-level state and the amplitude value in the low-amplitude-level state also varies between the time of data write (record) and the time of data read (reproduction). It is thus necessary to adjust the gains of the high gain amplifier 60 and low gain amplifier 61, which are included in the gain switch circuits 40 and 41, in accordance with the difference in amplitude.

In the gain control circuit 52, the sample/hold circuit 52*a* and amplitude detector 52*b* detect the amplitude value at the time when the amplitude level is high, and the sample/hold circuit 52*c* and amplitude detector 52*d* detect the amplitude value at the time when the amplitude level is low. The gain adjustment circuit 52*e* detects the ratio between the amplitude value detected by the amplitude detector 52*b* and the amplitude value detected by the amplitude detector 52*d*. The gain adjustment circuit 52*e* determines optical gains on the basis of the ratio between the amplitude values and adjusts the amounts of gains in the high gain amplifier 60 and low gain amplifier 61.

As described above, the gain control circuit 52 evaluates the properness of the amplifier gain ratio at the time of data write (record) and at the time of data read (reproduction), and adjusts the gains of the high gain amplifier 60 and low gain amplifier 61. Hence, with the switching of the optical gains at the time of data write (record) and at the time of data read (reproduction), the stable wobble signal with no stepped components (with the improved S/N ratio) can be detected.

Since it should suffice if the gain control circuit 52 detects the ratio between the amplitude value at the time when the amplitude level is high and the amplitude value at the time when the amplitude level is low, the signal with a long pulse T (e.g. 14 T) can be sampled/held. In other words, since the long sampling time can be secured, the stable signal sampling can be performed.

The gain switch circuit 40, 41, which is shown in FIG. 4, is configured to include the high gain amplifier 60 and low gain amplifier 61. Alternatively, the gain switch circuit 40, 41 may be configured to include three or more different gain amplifiers. In this case, the switch control circuit 50 discriminates which of a plurality of levels corresponds to the level of the all-addition signal that is input from the adder 50*a*, and executes switching to the gain amplifier corresponding to the discriminated level.

In the above description, the timing signal is generated by the switch control circuit 50 that is provided in the wobble detection circuit 14*u*. Alternatively, it is possible to adopt such a structure that the controller 24 generates the timing signal. In this case, a timing signal generating unit 24*f* is provided in the controller 24. The timing signal generating unit 24*f* generates a timing signal on the basis of the signal generated from the head amplifier 14 (e.g. addition signal (LVL), RF signal, or RF amplitude signal (RFRP)), and outputs the timing signal to the wobble detection circuit 14*u*. In accordance with the timing signal output from the timing signal generating unit 24*f*, the gain switch circuit 40, 41 of the wobble detection circuit 14*u* switches the gain and executes signal amplification in the same manner as described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk apparatus comprising:
   four photodetectors which detect reflective light from an optical disk;
   a signal generating unit which obtains an all-addition signal corresponding to a wobbling guide groove which is formed on the optical disk from detected signals of the four photodetectors;
   a determination unit which determines a type of the optical disk;
   a slice level switch unit which performs switching to a slice level according to the type of the optical disk determined by the determination unit;
   a timing signal generating unit which generates first and second timing signals in accordance with an amplitude level of the all-addition signal from the signal generating unit and the slice level switched by the type of the optical disk from the slice level switch unit;
   a wobble signal generating unit which outputs a signal which is amplified with a low gain amount by the first timing signal in a case where first and second arithmetic signals, which are generated for a wobble signal on the basis of signals output from the four photodetectors, are at a high amplitude level, and outputs a signal which is amplified with a high gain amount by the second timing signal in a case where the first and second arithmetic signals are at a low amplitude level;
   an output unit which outputs a wobble signal by subtracting the second arithmetic signal from the first arithmetic signal output from the wobble signal generating unit; and
   a gain control unit which obtains a ratio between a high amplitude value and a low amplitude value of the wobble signal output from the output unit, and controls switching of the gain amount of the wobble signal generating unit based on the ratio.

2. The optical disk apparatus according to claim 1, wherein the wobble signal generating unit includes:
   a first gain switch unit which switches a gain for the first arithmetic signal which represents an inner-peripheral-side push-pull signal that is detected on an inner peripheral side of the guide groove by output of the gain control unit; and
   a second gain switch unit which switches a gain for the second arithmetic signal which represents an outer-peripheral-side push-pull signal that is detected on an outer peripheral side of the guide groove by the output of the gain control unit.

3. The optical disk apparatus according to claim 2, wherein each of the first and second gain switch units includes:
   a first amplifier which is selected by the first timing signal from the timing signal generating unit and amplifies the first and second arithmetic signals, which are at the high amplitude level, with a low gain amount; and
   a second amplifier which is selected by the second timing signal from the timing signal generating unit and amplifies the first and second arithmetic signals, which are at the low amplitude level, with a high gain amount.

4. An optical disk apparatus comprising:
   four photodetectors which detect reflective light from an optical disk;
   a signal generating unit which obtains an all-addition signal corresponding to a wobbling guide groove which is formed on the optical disk from detected signals of the four photodetectors;
   a determination unit which determines a type of the optical disk;
   a slice level switch unit which performs switching to a slice level according to the type of the optical disk determined by the determination unit;
   a timing signal generating unit which generates first and second timing signals in accordance with an amplitude level of the all-addition signal from the signal generating unit and the slice level switched by the type of the optical disk from the slice level switch unit;
   a wobble signal generating unit which outputs, as a signal on which an LPP signal is superimposed, a signal which is amplified with a low gain amount by the first timing signal in a case where first and second arithmetic signals, which are generated for a wobble signal, on which the LPP signal is superimposed, on the basis of a signal output from the four photodetectors, are at a high amplitude level, and outputs, as the signal on which the LPP signal is superimposed, a signal which is amplified with a high gain amount by the second timing signal in a case where the first and second arithmetic signals are at a low amplitude levels
   an output unit which outputs a wobble signal by subtracting the second arithmetic signal from the first arithmetic signal output from the wobble signal generating unit; and
   a gain control unit which obtains a ratio between a high amplitude value and a low amplitude value of the wobble signal output from the output unit, and controls switching of the gain amount of the wobble signal generating unit based on the ratio.

5. An optical disk apparatus comprising:
   four photodetectors which detect reflective light from an optical disk;
   a signal generating unit which obtains an all-addition signal which is an RF signal corresponding to a wobbling guide groove which is formed on the optical disk from detected signals of the four photodetectors;
   a determination unit which determines a type of the optical disk;
   a slice level switch unit which performs switching to a slice level according to the type of the optical disk determined by the determination unit;
   a timing signal generating unit which generates first and second timing signals in accordance with an amplitude level of the all-addition signal from the signal generating unit and the slice level switched by the type of the optical disk from the slice level switch unit;
   a wobble signal generating unit which outputs a signal which is amplified with a low gain amount by the first timing signal in a case where first and second arithmetic signals, which are generated for a wobble signal on the basis of signals output from the four photodetectors, are at a high amplitude level, and outputs a signal which is amplified with a high gain amount by the second timing signal in a case where the first and second arithmetic signals are at a low amplitude level;
   an output unit which outputs a wobble signal by subtracting the second arithmetic signal from the first arithmetic signal output from the wobble signal generating unit;
   a first detection unit which detects a high amplitude value of the wobble signal that is output from the output unit;

a second detection unit which detects a low amplitude value of the wobble signal that is output from the output unit; and a gain control unit which obtains a ratio between the high amplitude value and the low amplitude value, and controls switching of the gain amount of the wobble signal generating unit on the basis of the ratio.

6. The optical disk apparatus according to claim 5, wherein the wobble signal generating unit includes:

a first gain switch unit which switches a gain for the first arithmetic signal which represents an inner-peripheral-side push-pull signal that is detected on an inner peripheral side of the guide groove, by supplying a switch signal from the gain control unit and the first and second timing signals from the timing signal generating unit; and a second gain switch unit which switches a gain for the second arithmetic signal which represents an outer-peripheral-side push-pull signal that is detected on an outer peripheral side of the guide groove, by supplying the switch signal from the gain control unit and the first and second timing signals from the timing signal generating unit.

7. The optical disk apparatus according to claim 6, wherein each of the first and second gain switch units includes:

a first amplifier which is selected by the first timing signal, is gain-adjustable by the switch signal from the gain control unit and amplifies the first and second arithmetic signals, which are at the high amplification level, with a low gain amount; and a second amplifier which is selected by the second timing signal, is gain-adjustable by the switch signal from the gain control unit and amplifies the first and second arithmetic signals, which are at the low amplification level, with a high gain amount.

* * * * *